United States Patent [19]

Kile et al.

[11] 4,093,004

[45] June 6, 1978

[54] ARMORED CONDUIT

[75] Inventors: Stephen A. Kile; Rufus V. Jones, both of Bartlesville, Okla.

[73] Assignee: Phillips Petroleum Company, Bartlesville, Okla.

[21] Appl. No.: 57,808

[22] Filed: Jul. 23, 1970

[51] Int. Cl.$^2$ .............................................. F16L 9/14
[52] U.S. Cl. .................................. 138/140; 138/137; 138/177
[58] Field of Search ............... 138/143, 140, 131, 137, 138/139, 172, 147, 125; 156/172

[56] References Cited

U.S. PATENT DOCUMENTS

| | | | |
|---|---|---|---|
| 2,888,954 | 6/1959 | Gates | 138/137 |
| 2,932,323 | 4/1960 | Aries | 138/137 |
| 3,333,605 | 11/1967 | Bearer | 138/141 |
| 3,390,704 | 7/1968 | Woodell | 138/143 |

*Primary Examiner*—Samuel Feinberg

[57] ABSTRACT

A conduit structure is provided which is comprised of layers of crosslapped oriented polyolefin material. The conduit structure is resistant to penetration by shrapnel and projectile penetration.

4 Claims, No Drawings

ARMORED CONDUIT

This invention relates to conduit which is resistant to shrapnel, fragments, and projectile penetration. It further relates to conduit comprised of layered units of oriented polyolefin material wherein the units of oriented film are positioned such that the orientation direction of adjacent units is not the same. This invention more particularly relates to a conduit comprising a substrate having placed thereon crosslapped layers of oriented polyolefin material.

Conduit which is used to contain and protect items such as electrical wiring, electrical and mechanical connections, fluid and hydraulic services and the like is vulnerable to penetration by various objects including shrapnel, shell fragments, and projectiles. The items contained in such conduits are, accordingly, vulnerable to damage or other casualty on account of penetrating objects. This vunerability is very severe when, for example, the conduit is used to protect vital connections and services in an airplane wherein damage to them can result in serious consequences. It is one solution to merely armor the conduit by conventional means, such as with metal, but against the added protection must be balanced the added weight which would accompany this type protection. There is thus presented an urgent need for a lightweight armored conduit structure which can be used to protect vulnerable connections and services in weight sensitive applications such as modern aircraft.

It is thus an object of this invention to provide a lightweight conduit structure capable of stopping bullets and shell fragments.

It is a further object of this invention to provide a lightweight armored conduit structure comprising a conduit substrate having on the periphery thereof a material which will protect the substrate from damage caused by impacting fragments and projectiles.

Other objects, aspects, and the several advantages of this invention will become apparent to one skilled in the art from a consideration of the following specification and claims.

In accordance with this invention there is provided a novel article of manufacture comprising a lightweight conduit structure capable of containing and protecting wiring, connections, fluid and hydraulic services and the like from impacting fragments. The conduit structure is comprised of a plurality of layered units of oriented polyolefin material which is positioned in the structure in such a manner that the direction of orientation of adjacent units are at angles one to the other. The conduit structure can consist solely of the oriented polyolefin material suitably shaped to form a closed tubular member having at least two open ends to facilitate the insertion of wires or the like; however, the structure can also comprise a substrate having on the periphery thereof the layered units of polyolefin material wherein the adjacent units are crosslapped to provide the above-mentioned condition wherein the direction of orientation of adjacent units are at angles one to the other.

The substrate can be of any desirable exterior shape or material so long as it has sufficient compressive strength to support the polyolefin material established on its periphery. Relating to the substrate material, any material capable of being shaped into a conduit whether it have a round, rectangular, or polysided cross section and whether it be paper, paper board, metal, plastic, rubber, wood and the like can be used. The only requirement of the substrate is that it be capable of enclosing the item to be protected and that it resist collapse caused by external inward pressure of the polyolefin material.

The polyolefin material is applied to the substrate by merely wrapping the material around the substrate in such a manner that successive layered units of material will be at angles. When a desirable thickness of material is established the material can be secured to prevent its becoming unwrapped by any conventional means such as by the use of adhesives. The material has superior ballistic properties whether it be in a nonbonded or in a bonded condition. Thus, subsequent to establishing the material on the conduit structur, it can be utilized in a nonbonded condition, or in a bonded condition as shall be hereinafter described.

In another aspect of this invention the layered polyolefin material can be covered on its outer periphery with a suitable protective material. The function of the protective material, especially where the polyolefin material is nonbonded, is to prevent unraveling, unwinding, or otherwise delaminating of the polyolefin. In addition the protective material can also have ballistic properties (resistance to penetration by impacting shrapnel, shell fragments, projectiles, and the like) to supplement the ballistic properties of the polyolefin material. The protective material can be used with the polyolefin material alone, or with the above mentioned substrate and the polyolefin. It is thus seen that the conduit structure can consist solely of the polyolefin material or it can consist of the polyolefin material in combination with either the substrate or the protective material or with both the substrate and the protective material.

The protective material can be any one of several materials which can be wrapped around, adhered to, painted on, or clad to the periphery of the polyolefin material. Some examples include plastic wrap, rubber, shellac, varnish, metal foil, sheet metal, and ceramics.

The term "material" referred to herein in connection with the polyolefin material refers to films, filaments, fibers, ribbons and the like for the sake of convenience. However, it is to be understood that the phrase "polyolefin material" is to be construed as "polyolefin film, filaments, fibers, ribbon and the like" unless otherwise specifically indicated.

The term "filament" as used herein is intended to include monofilament or multifilaments of olefin polymer having a single direction of orientation. Such filaments generally have an aspect ratio in the range of 1:1 to 20:1.

As used herein the term "ply" is intended to cover a single sheet of unidirectionally oriented olefin polymer material or a single layer composed of a plurality of unidirectionally oriented olefin polymer filaments in which the direction of orientation of each filament forming the layer thereof is the same.

The term "unit" as used herein is intended to cover a single composite of material having one or more ply therein and which is characterized by the fact that the direction of orientation of each ply therein is the same.

The synthetic linear olefin polymers used in the present invention are solid, high molecular weight products or mixtures thereof which are capable of being formed into polyolefin materials which can be drawn to a high percentage of elongation. Drawing of the material can be accomplished by passing same through a heating zone wherein the material is exposed to an elevated temperature which is below the temperature at which the material becomes molten for a sufficient time to heat same above its ambient temperature and render same orientable upon elongation so as to obtain material showing characteristic, molecular orientation along the fiber axis of the filaments or along the direction of the draw in the plane of the films. However, any means for achieving orientation of the material can be used in forming the oriented material to be used in formation of the armored conduit structure of this invention.

The material should be highly oriented. Such orientation is achieved by drawing the material of which the conduit structure is to be constructed at a draw ratio of 6:1 to 20:1, preferably 9:1 to 14:1.

Olefin polymers which are suitable for forming the material to be used in the formation of the armor structure of this invention are those solid, orientable polymers formed by the polymerization of at least one monoolefin having from 2 to 8 carbon atoms therein. Such polymers include polyethylene, polypropylene, poly(1-butene), ethylene-1-butene copolymers, ethylene-propylene copolymers and the like, as well as blends or mixtures thereof. Such polymers are well known in the art and can be produced, for example, in accordance with the process of Hogan and Banks as set forth in U.S. Pat. No. 2,825,721. It should, however, be understood that the process for producing the synthetic linear olefin polymers from which the material of this invention are formed is not critical and they can be produced by any process which will provide a solid polymeric composition which is capable of achieving the degree of elongation as hereinafter defined.

In one embodiment of the invention the oriented olefin polymer material employed in forming the units of the conduit structure is oriented polypropylene.

Each unit used in the formation of the armor structure will generally contain from 1 to 100 plies of oriented olefin polymer material, preferably from 2 to 40 plies, wherein the direction of orientation of each ply is the same and wherein each ply has a thickness of 0.5 to 25.0 mils.

In the formation of the armor structure the adjacent units of oriented material can be placed in any configuration so long as the direction of orientation of each unit differs. Preferably the direction of orientation differs 90° but a lesser angular difference can be employed.

The total thickness of the armor structure of this invention is dependent upon the end use to be made of the conduit structure and the desired protection to be provided. Thus, for example, the nonbonded material having a weight of 16 oz/sq. ft. (areal density) is capable of precluding penetration when fired upon by a 38-caliber blunt nose bullet. Obviously, where higher velocity projectiles are to be precluded from total penetration a thicker armor structure will be required. Also a combination of thicker, bonded material can be utilized.

Bonding of the units consisting of one or more plies is carried but by subjecting the positioned units to compression at elevated temperatures. Due to the unique nature of the ply-forming material, no additional adhesives or bonding agents are required in bonding. The composite of units after being positioned on the conduit structure in the manner as herein described is placed into a suitable pressing means and subjected to an elevated temperature below the melting point of the polymer composition at atmospheric pressure and to a pressure sufficient to achieve bonding. Ordinarily a press temperature in the range of 50° to 200° C. is employed. The pressure at which the press is operated is in the range of 50 to 100,000 psi and preferably 1000 to 50,000 psi. However, both pressures and temperatures outside these ranges can be utilized in achieving bonding of the ply units although the above conditions for bonding are most suitable when utilizing conventional pressing apparatus.

In another aspect of this invention, unidirectionally oriented film or filaments are woven into mats with the direction of the orientation of the warp being different from that of the direction of orientaton of the filler. Weaving of the oriented film or filaments can be carried out in any conventional manner. The resulting woven material is then utilized in the same way as the previously described ply units.

The materials used in the formation of the conduit structure of this invention can be both of the solid or foamed types which are known to the art. In addition, such materials can contain a variety of additives therein such as pigments, fillers, UV stabilizers, fire retardants, antioxidants, insect and rodent repellents and the like in varying amounts so long as the desired properties of the materials are not adversely affected.

The following example is illustrative but not limitative of the armored conduit of this invention.

EXAMPLE

A ⅛-inch wide by 1.4 mil thick polypropylene ribbon filament which was unidirectionally oriented in the longitudinal direction at a draw ratio of 7 to 1 was wound by means of a Leesona winder on a 4 inch O.D. spiral wound, hollow, rigid paper cylinder having a 5/16-inch thick wall. The machine was adjusted to provide adjacent layers of wound filament at an angle of approximately 30° one to another. The ribbon was wound on the core until a ¼-inch thick by 6-inch long filament wrap having an areal density of approximately 16 ounces per square foot was established on the periphery thereof wherein, as previously stated, each layer of oriented filaments was at an angle of approximately 30° to adjacent layers. The completed conduit structure was not bonded, however, the ribbon end was secured to prevent unraveling.

The above described conduit structure was then twice fired upon from a distance of 6 feet by a 38-caliber police special pistol which was loaded with 158-grain lead slugs. The two shots were directed to approximately opposite sides of the cylinder with one shot being placed approximately 1-inch from one end of the wrap and the other being placed approximately 2-inches from the opposite end of the wrap.

The bullets did not pierce the wrap, although the paper cylinder substrate was split and otherwise deformed opposite the impact points of the slugs.

Reasonable variations and modifications of this invention can be made or followed, in view of the foregoing disclosure, without departing from the spirit or scope thereof.

That which is claimed is:

1. An article of manufacture comprising a conduit structure comprised of a plurality of layers of oriented polyolefin material wherein said polyolefin material is positioned such that the orientation direction of adjacent layers are at angles one to the other and wherein said plurality of layers of oriented polyolefin material has established on the outer periphery thereof a covering material for the protection of said polyolefin.

2. The article of manufacture of claim 1 wherein said covering material has ballistic properties.

3. An article of manufacture comprising a conduit structure comprised of a plurality of layers of oriented polyolefin material wherein said polyolefin material is positioned such that the orientation direction of adjacent layers are at angles one to the other and wherein said conduit structure is comprised of a substrate having on the periphery thereof said layers of oriented polyolefin material and wherein said layered, oriented polyolefin material has established on the outer periphery thereof a covering material for the protection of said polyolefin material.

4. The article of manufacture of claim 3 wherein said covering material has ballistic properties.

* * * * *